United States Patent
Wu

(10) Patent No.: US 12,335,700 B2
(45) Date of Patent: Jun. 17, 2025

(54) BLUETOOTH SPEAKER CONTROL METHOD AND SYSTEM, STORAGE MEDIUM, AND MOBILE TERMINAL

(71) Applicant: JRD COMMUNICATION (SHENZHEN) LTD., Guangdong (CN)

(72) Inventor: Taiyun Wu, Guangdong (CN)

(73) Assignee: JRD COMMUNICATION (SHENZHEN) LTD., Guangdong (CN)

( * ) Notice: Subject to any disclaimer, the term of this patent is extended or adjusted under 35 U.S.C. 154(b) by 238 days.

(21) Appl. No.: 18/043,907

(22) PCT Filed: Nov. 13, 2020

(86) PCT No.: PCT/CN2020/128776
§ 371 (c)(1),
(2) Date: Mar. 2, 2023

(87) PCT Pub. No.: WO2022/048020
PCT Pub. Date: Mar. 10, 2022

(65) Prior Publication Data
US 2023/0370774 A1  Nov. 16, 2023

(30) Foreign Application Priority Data

Sep. 4, 2020 (CN) .......................... 202010924318.4

(51) Int. Cl.
*H04R 3/12* (2006.01)
*H04W 4/80* (2018.01)
(52) U.S. Cl.
CPC ................ *H04R 3/12* (2013.01); *H04W 4/80* (2018.02); *H04R 2420/07* (2013.01)
(58) Field of Classification Search
CPC .............................. H04R 3/12; H04R 2420/07; H04R 2227/005; H04W 4/80
(Continued)

(56) References Cited

U.S. PATENT DOCUMENTS

| | | |
|---|---|---|
| 9,736,614 B2 | 8/2017 | Kofman et al. |
| 2012/0058727 A1 | 3/2012 | Cook et al. |

(Continued)

FOREIGN PATENT DOCUMENTS

| | | |
|---|---|---|
| CN | 101465910 A | 6/2009 |
| CN | 105898503 A | 8/2016 |

(Continued)

OTHER PUBLICATIONS

International Search Report in International application No. PCT/CN2020/128776, mailed on Apr. 28, 2021.

(Continued)

*Primary Examiner* — Eugene Yun
(74) *Attorney, Agent, or Firm* — PV IP PC; Wei Te Chung

(57) ABSTRACT

Disclosed are a Bluetooth speaker control method and system, a storage medium, and a mobile terminal. The method includes constructing a plurality of sound channels by means of an audio manager in a system framework of a mobile terminal; then constructing a plurality of virtual Bluetooth audio transmission model protocol channels by means of a Bluetooth protocol stack of the mobile terminal; and correspondingly connecting the plurality of virtual Bluetooth audio transmission model protocol channels to a plurality of external Bluetooth speakers, such that audio information in the plurality of sound channels is played by means of the plurality of Bluetooth speakers. In addition, the method performs synchronous detection on the plurality of Bluetooth speakers to avoid the delay of audio signals of the plurality of Bluetooth speakers.

10 Claims, 3 Drawing Sheets

(58) Field of Classification Search
USPC .......................................................... 455/41.3
See application file for complete search history.

(56) References Cited

U.S. PATENT DOCUMENTS

| | | |
|---|---|---|
| 2016/0227319 A1 | 8/2016 | Zhao et al. |
| 2016/0286330 A1 | 9/2016 | Kofman et al. |
| 2016/0309258 A1* | 10/2016 | Hiscock .................. H04S 7/301 |

FOREIGN PATENT DOCUMENTS

| | | |
|---|---|---|
| CN | 107864432 A | 3/2018 |
| CN | 108200495 A | 6/2018 |
| CN | 109089330 A | 12/2018 |
| CN | 111343620 A | 6/2020 |

OTHER PUBLICATIONS

Written Opinion of the International Search Authority in International application No. PCT/CN2020/128776, mailed on Apr. 28, 2021.
1st Chinese Office Action issued in corresponding Chinese Patent Application No. 202010924318.4 dated Mar. 23, 2021, pp. 1-8.
2nd Chinese Office Action issued in corresponding Chinese Patent Application No. 202010924318.4 dated Jul. 14, 2021, pp. 1-8.
Design and implementation of intelligent bluetooth speaker system based on Arduino Nano V3, dated Feb. 28, 2020, all pages.

\* cited by examiner

BLUETOOTH SPEAKER CONTROL METHOD AND SYSTEM, STORAGE MEDIUM, AND MOBILE TERMINAL

CROSS-REFERENCE TO RELATED APPLICATIONS

This application claims priority to Chinese Patent Application No. 202010924318.4, filed with the Chinese Patent Office on Sep. 4, 2020, and entitled "BLUETOOTH SPEAKER CONTROL METHOD AND SYSTEM, STORAGE MEDIUM, AND MOBILE TERMINAL". The entire disclosures of the above application are incorporated herein by reference.

TECHNICAL FIELD

The present application relates to computer technology, in particular to a Bluetooth speaker control method and system, a storage medium, and a mobile terminal.

BACKGROUND

The current concept of home theater is expensive, requires wiring, and is heavy in the impression of ordinary people. At least it needs a player (usually a DVD player), power amplifier, 5.1-channel audio, and a lot of wires.

With the development of control terminals and wireless transmission technology, wireless speakers are becoming more and more popular, making any room a place to enjoy music as you like. In a wireless music system composed of wireless speakers, it generally consists of multiple wireless speakers. These speakers can be placed in multiple places in the home, such as some in the living room, some in the bedroom, some in the study and so on. These wireless speakers can be connected and communicated with each other through wireless transmission technology.

At present, if the number of wireless speakers controlled by a mobile terminal is limited, it is only one. Therefore, the user cannot enjoy the multi-channel sound effect of multiple sound boxes (for example, 4 sound boxes).

In addition, since the audio signal needs to be encoded and decoded during the wireless transmission process, the process of encoding and decoding the audio signal requires a certain amount of time. Therefore, when the corresponding audio signal is played, the phenomenon of audio signal delay may occur, which affects the auditory effect and experience of the user.

SUMMARY

Technical Problem

Embodiments of the present application provide a Bluetooth speaker control method and system, a storage medium, and a mobile terminal, which not only effectively solves the issue that the mobile terminal cannot be connected to multiple speakers at the same time, but also solves the issue of audio playback delay caused by connecting multiple speakers through Bluetooth.

Technical Solution

According to one aspect of the present application, an embodiment of the present application provides a Bluetooth speaker control method, the control method comprises following steps: acquiring an audio information; parsing the audio information; constructing multiple sound channels through an audio manager in a system framework of the mobile terminal; constructing multiple virtual Bluetooth audio transmission model protocol channels through a Bluetooth protocol stack of the mobile terminal; correspondingly connecting the virtual Bluetooth audio transmission model protocol channels with multiple external Bluetooth speakers; transmitting parsed audio information to the multiple sound channels in the audio manager; and playing the audio information in the multiple sound channels through the multiple external Bluetooth speakers.

Further, the method also includes the steps of: performing synchronous detection on the multiple external Bluetooth speakers.

Further, in the step of performing synchronous detection on the multiple external Bluetooth speakers, the method further comprises the following step: acquiring delay times of the multiple external Bluetooth speakers.

Further, in the step of performing synchronous detection on the multiple external Bluetooth speakers, the method further comprises following steps: determining a longest delay time according to obtained delay times of the multiple external Bluetooth speakers; and configuring the longest delay time as a delay time of an audio playback.

According to another aspect of the present application, an embodiment of the present application provides a Bluetooth speaker control system, the Bluetooth speaker control system comprises: an audio acquirer configured to acquire an audio information; an audio parser configured to parse the audio information; a sound channel constructer configured to construct multiple sound channels through an audio manager in a system framework of the mobile terminal; a Bluetooth protocol constructer configured to construct multiple virtual Bluetooth audio transmission model protocol channels through a Bluetooth protocol stack of the mobile terminal; a connector configured to correspondingly connect the virtual Bluetooth audio transmission model protocol channels with multiple external Bluetooth speakers; an audio information transmitter configured to transmit parsed audio information to the multiple sound channels in the audio manager; and an audio information player configured to play the audio information in the multiple sound channels through the multiple external Bluetooth speakers.

Further, the system also includes: a synchronization detector configured to perform synchronous detection on the multiple external Bluetooth speakers.

Further, the synchronization detector comprises: a delay acquirer configured to acquire delay times of the multiple external Bluetooth speakers.

Further, the synchronization detector further comprises: a delay time determiner configured to determine a longest delay time according to obtained delay times of the multiple external Bluetooth speakers; and a delay time configurer configure to configure the longest delay time as a delay time of an audio playback.

According to still another aspect of the present application, the embodiment of the present application provides a storage medium, multiple instructions are stored in the storage medium, and the instructions are configured to be loaded by a processor to execute any one of the Bluetooth speaker control methods.

According to still another aspect of the present application, the embodiment of the present application provides a mobile terminal comprising a processor and a memory, the processor is electrically connected to the memory, the memory is configured to store instructions and data, and the processor is configured to execute steps of any one of the Bluetooth speaker control methods.

Beneficial Effect

The advantage of the present application is that, compared with the prior art, the method of the present application comprises: constructing a plurality of sound channels by means of an audio manager in a system framework of a mobile terminal; then constructing a plurality of virtual Bluetooth audio transmission model protocol channels by means of a Bluetooth protocol stack of the mobile terminal; and correspondingly connecting the plurality of virtual Bluetooth audio transmission model protocol channels to a plurality of external Bluetooth speakers, such that audio information in the plurality of sound channels is played by means of the plurality of Bluetooth speakers. In addition, the method performs synchronous detection on the plurality of Bluetooth speakers to avoid the delay of audio signals of the plurality of Bluetooth speakers.

BRIEF DESCRIPTION OF THE DRAWINGS

The technical solutions and other beneficial effects of the present application will be apparent through the detailed description of the specific embodiments of the present application below in conjunction with the accompanying drawings.

DETAILED DESCRIPTION OF ILLUSTRATED EMBODIMENTS

The following will clearly and completely describe the technical solutions in the embodiments of the application with reference to the drawings in the embodiments of the application. Apparently, the described embodiments are only some of the embodiments of the application, not all of them. Based on the embodiments in the present application, all other embodiments obtained by those skilled in the art without making creative efforts belong to the scope of protection of the present application.

Figure 1:
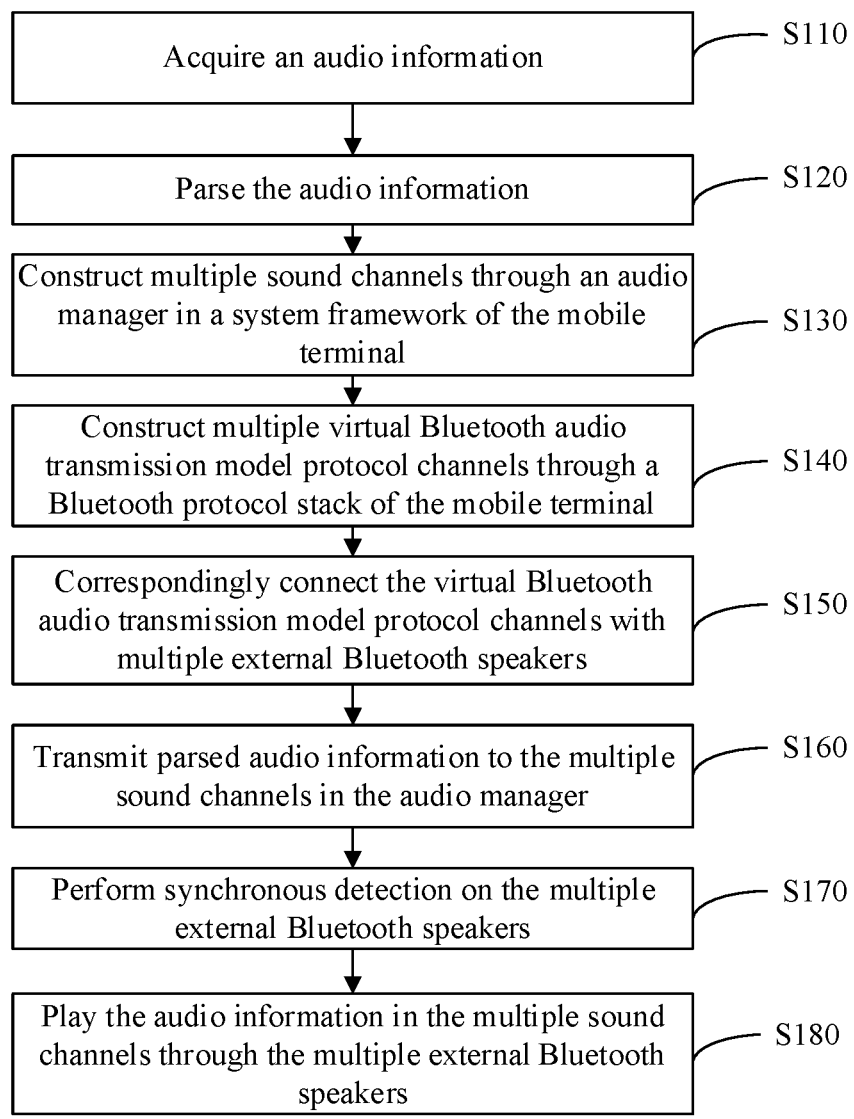
FIG. 1 is a flowchart of steps of a Bluetooth speaker control method provided by an embodiment of the present application.

As shown in FIG. 1, which is a flowchart of steps of a Bluetooth speaker control method provided by an embodiment of the present application. The Bluetooth speaker control method is applicable to a mobile terminal, and the control method includes steps:

Step S110: Acquire an audio information.

In the embodiment of this application, the audio information refers to audible sounds from various sound sources in nature and speech or music synthesized by a computer through special equipment.

Step S120: Parse the audio information.

In the embodiment of the present application, when the audio and video source is played, the media decoder in the system architecture layer of the mobile terminal (such as an Android phone) is invoked to decode the audio information.

Step S130: Construct multiple sound channels through an audio manager in a system framework of the mobile terminal.

In the embodiments described in the present application, the sound channel refers to mutually independent audio signals that are collected or played back at different spatial positions during sound recording or playback. Therefore, the number of channels is also the number of sound sources during sound recording or the corresponding number of speakers during playback. Specifically, for example, the obtained stereo sound is processed through an upmixing algorithm of an upmixing module of the audio manager, and output through delay module, low-pass filter module and phase shift module to form four-channel. For another example, the obtained 5.1 channels are processed by the upmixing algorithm of the downmixing module of the audio manager to form corresponding four channels.

Step S140: Construct multiple virtual Bluetooth audio transmission model protocol channels through a Bluetooth protocol stack of the mobile terminal.

In the embodiment described in this application, the Bluetooth protocol stack structure can enable the radio frequency connection between various Bluetooth devices. The Bluetooth Audio Distribution Profile Protocol (referred to as A2DP) is an audio transmission protocol of Bluetooth, which is applied to Bluetooth devices. It defines the parameter negotiation, establishment, and transmission process of data stream handles between Bluetooth devices, as well as the signaling entity forms exchanged with each other. Therefore, multiple channels using the Bluetooth audio transmission model protocol can be virtualized through the Bluetooth protocol stack.

Step S150: Correspondingly connect the virtual Bluetooth audio transmission model protocol channels with multiple external Bluetooth speakers.

In the embodiment described in this application, the Bluetooth speaker has a built-in Bluetooth chip, and the Bluetooth connection is used instead of the wire connection. Therefore, through the implementation of step S140 and step S150, the Bluetooth protocol stack of the mobile terminal can be connected correspondingly with multiple Bluetooth speakers through the Bluetooth protocol.

Step S160: Transmit parsed audio information to the multiple sound channels in the audio manager.

In this embodiment, the parsed audio information includes four channels. Therefore, four A2DP protocol channels can be virtualized through the Bluetooth protocol stack to connect to the four Bluetooth speakers. Further, in other partial implementations, the audio information may also include three channels, five channels, or multiple channels. Therefore, a corresponding number of A2DP protocol channels can also be virtualized through the Bluetooth protocol stack to connect with multiple external Bluetooth speakers. Further, the audio information of the corresponding protocol channels may be transmitted respectively in a time-division multiplexing manner.

Step S170: Perform synchronous detection on the multiple external Bluetooth speakers.

Figure 2:
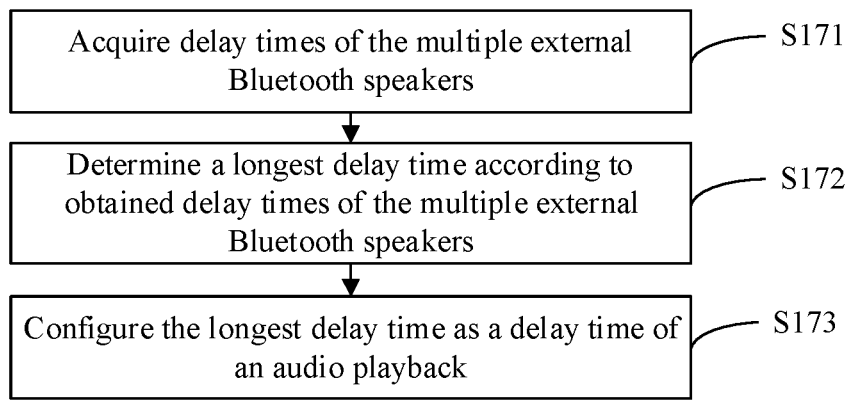
FIG. 2 is a flowchart of sub-steps of step S170 in an embodiment of the present application.

In this embodiment, synchronous detection is performed on the multiple Bluetooth speakers to avoid delays in audio signals of the multiple Bluetooth speakers. The specific operation includes the following steps:

Refer to the description of FIG. 2 in combination.

Step S171: Acquire delay times of the multiple external Bluetooth speakers.

In this step, each Bluetooth speaker can be tested to play audio, and the sound can be collected by the microphone of the mobile phone, so as to obtain the delay time of the corresponding Bluetooth speaker.

Step S172: Determine a longest delay time according to obtained delay times of the multiple external Bluetooth speakers.

Due to the different delay times of multiple Bluetooth speakers, it is necessary to determine the longest delay time. In this example, the number of the Bluetooth speakers is four. Therefore, it is necessary to test the audio playback of the four Bluetooth speakers and obtain the delay time of the corresponding Bluetooth speakers.

Step S173: Configure the longest delay time as a delay time of an audio playback.

In this step, by configuring the longest delay time as the delay time of audio playback, the audio signal delay of multiple Bluetooth speakers can be avoided.

Continue to refer to FIG. 1, step S180: Play the audio information in the multiple sound channels through the multiple external Bluetooth speakers.

In this step, the audio information in multiple channels (for example, four channels) is transmitted to a corresponding Bluetooth speaker and played.

The method described in this application can realize the control of multiple Bluetooth speakers by one mobile terminal through the implementation of the above steps S110 to S180. In addition, the method detects the multiple Bluetooth speakers synchronously, so as to avoid delays in the audio signals of the multiple Bluetooth speakers.

The advantage of the present application is that, compared with the prior art, the method of the present application comprises: constructing a plurality of sound channels by means of an audio manager in a system framework of a mobile terminal; then constructing a plurality of virtual Bluetooth audio transmission model protocol channels by means of a Bluetooth protocol stack of the mobile terminal; and correspondingly connecting the plurality of virtual Bluetooth audio transmission model protocol channels to a plurality of external Bluetooth speakers, such that audio information in the plurality of sound channels is played by means of the plurality of Bluetooth speakers. In addition, the method performs synchronous detection on the plurality of Bluetooth speakers to avoid the delay of audio signals of the plurality of Bluetooth speakers.

Figure 3:
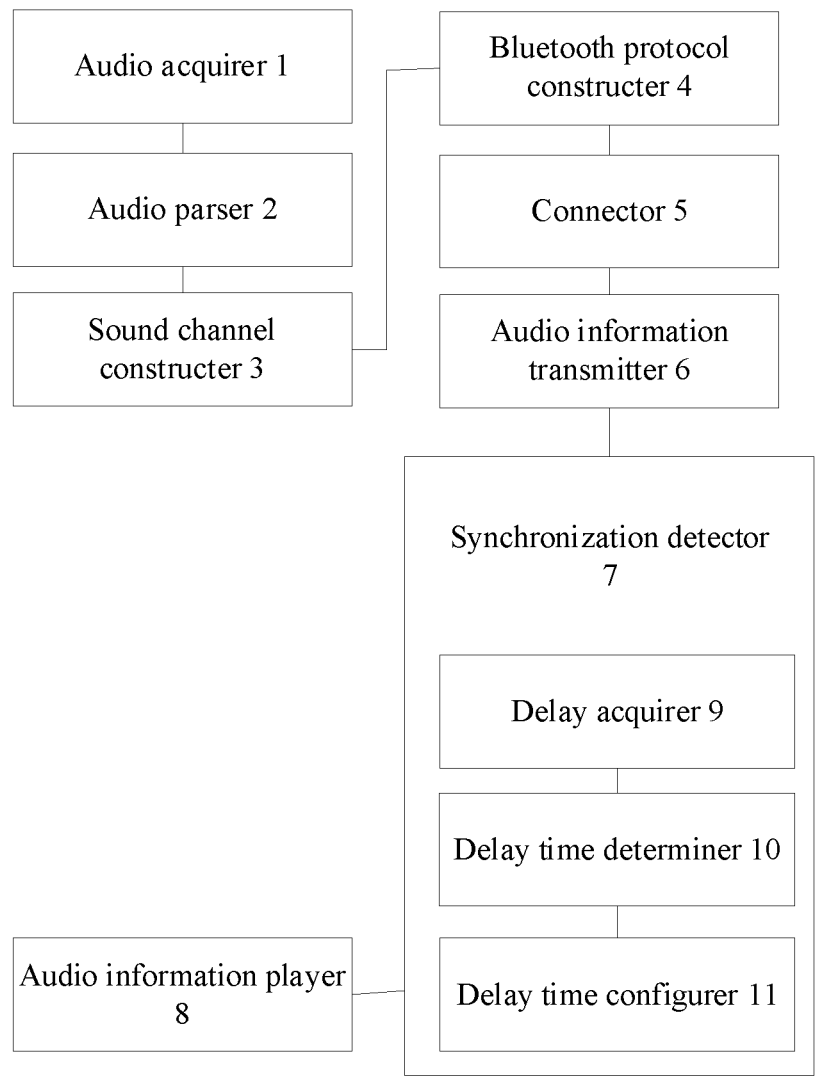
FIG. 3 is a schematic structural diagram of a Bluetooth speaker control system provided by an embodiment of the present application.

As shown in FIG. 3, which is a schematic structural diagram of a Bluetooth speaker control system provided by the embodiment of the present application, including: an audio acquirer 1, an audio parser 2, a sound channel constructer 3, a Bluetooth protocol constructer 4, a connector 5, an audio information transmitter 6, an audio information player 8, and a synchronization detector 7.

The audio acquirer 1 is configured to acquire an audio information. In the embodiment of this application, the audio information refers to audible sounds from various sound sources in nature and speech or music synthesized by a computer through special equipment.

The audio parser 2 is configured to parse the audio information. In the embodiment of the present application, when the audio and video source is played, the media decoder in the system architecture layer of the mobile terminal (such as an Android phone) is invoked to decode the audio information.

The sound channel constructer 3 is configured to construct multiple sound channels through an audio manager in a system framework of the mobile terminal. In the embodiments described in the present application, the sound channel refers to mutually independent audio signals that are collected or played back at different spatial positions during sound recording or playback. Therefore, the number of channels is also the number of sound sources during sound recording or the corresponding number of speakers during playback.

The Bluetooth protocol constructer 4 is configured to construct multiple virtual Bluetooth audio transmission model protocol channels through a Bluetooth protocol stack of the mobile terminal. In the embodiment described in this application, the Bluetooth protocol stack structure can enable the radio frequency connection between various Bluetooth devices. The Bluetooth Audio Distribution Profile Protocol (referred to as A2DP) is an audio transmission protocol of Bluetooth, which is applied to Bluetooth devices. It defines the parameter negotiation, establishment, and transmission process of data stream handles between Bluetooth devices, as well as the signaling entity forms exchanged with each other. Therefore, multiple channels using the Bluetooth audio transmission model protocol can be virtualized through the Bluetooth protocol stack.

The connector 5 is configured to correspondingly connect the virtual Bluetooth audio transmission model protocol channels with multiple external Bluetooth speakers. In this embodiment, the Bluetooth speaker has a built-in Bluetooth chip, and the Bluetooth connection replaces the wire connection. Therefore, by invoking the Bluetooth protocol constructer 4 and the connector 5, the Bluetooth protocol stack of the mobile terminal can be connected correspondingly to multiple Bluetooth speakers through the Bluetooth protocol.

The audio information transmitter 6 is configured to transmit parsed audio information to the multiple sound channels in the audio manager. In this embodiment, the parsed audio information includes four channels. Therefore, four A2DP protocol channels can be virtualized through the Bluetooth protocol stack to connect to the four Bluetooth speakers. Further, in other partial implementations, the audio information may also include three channels, five channels, or multiple channels. Therefore, a corresponding number of A2DP protocol channels can also be virtualized through the Bluetooth protocol stack to connect with multiple external Bluetooth speakers. Further, the audio information of the corresponding protocol channels may be transmitted respectively in a time-division multiplexing manner.

The synchronization detector 7 is configured to perform synchronous detection on the multiple external Bluetooth speakers. The synchronization detector 7 includes: a delay acquirer 9, a delay time determiner 10, and a delay time configurer 11.

The delay acquirer 9 is configured to acquire delay times of the multiple external Bluetooth speakers. Specifically, each Bluetooth speaker can be tested to play audio, and the sound can be collected by the microphone of the mobile phone, so as to obtain the delay time of the corresponding Bluetooth speaker.

The delay time determiner 10 is configured to determine a longest delay time according to obtained delay times of the multiple external Bluetooth speakers. Since the delay times of multiple Bluetooth speakers are different, it is necessary to determine the longest delay time. In this example, the number of the Bluetooth speakers is four. Therefore, it is necessary to test the audio playback of the four Bluetooth speakers and obtain the delay time of the corresponding Bluetooth speakers.

The delay time configurer 11 is configure to configure the longest delay time as a delay time of an audio playback. In the embodiment of the present application, by configuring the longest delay time as the delay time of audio playback, the audio signal delay of multiple Bluetooth speakers can be avoided.

The audio information player 8 is configured to play the audio information in the multiple sound channels through the multiple external Bluetooth speakers. The audio information in multiple channels (such as four channels) is transmitted to the corresponding Bluetooth speaker and played.

Therefore, the system of the present application constructs multiple sound channels through the audio manager in the system framework of the mobile terminal. Then construct a plurality of virtual Bluetooth audio transmission model protocol channels through the Bluetooth protocol stack of the mobile terminal. Correspondingly connect the multiple virtual Bluetooth audio transmission model protocol channels with multiple external Bluetooth speakers. The audio information in the multiple sound channels is played through the multiple Bluetooth speakers, so that one mobile terminal can control multiple Bluetooth speakers.

Figure 4:
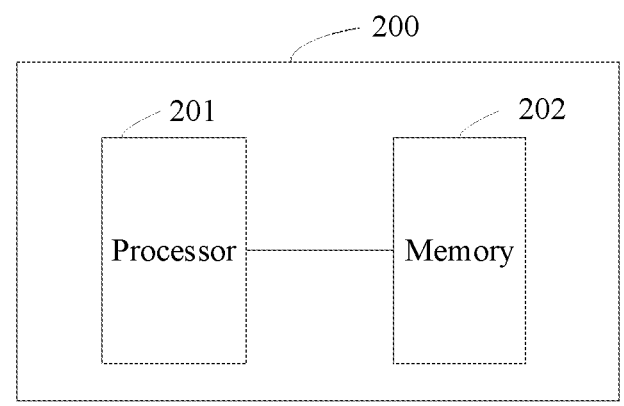
FIG. 4 is a schematic structural diagram of a mobile terminal provided by an embodiment of the present application.

In addition, in an embodiment of the present application, a mobile terminal is also provided, and the mobile terminal may be a device such as a smart phone or a tablet computer. Specifically, as shown in FIG. 4, the mobile terminal 200 includes a processor 201 and a memory 202. The processor 201 is electrically connected with the memory 202.

The processor 201, as a control center of the mobile terminal 200, is connected to all parts of the entire mobile terminal by using various interfaces and lines. By running or executing a software program that is stored in the memory 202 and invoking data stored in the memory 202, the processor 201 executes various functions of the mobile terminal and processes data, so as to perform overall monitoring on the mobile terminal.

In this embodiment, the mobile terminal 200 is provided with multiple storage partitions. The multiple storage partitions include a system partition and a target partition. The processor 201 in the mobile terminal 200 may load instructions corresponding to the process of one or more application programs into the memory 202 according to the following steps, and the application program stored in the memory 202 is run by the processor 201, thereby realizing various functions:

Acquiring an audio information;
Parsing the audio information;
Constructing multiple sound channels through an audio manager in a system framework of the mobile terminal;
Constructing multiple virtual Bluetooth audio transmission model protocol channels through a Bluetooth protocol stack of the mobile terminal;
Correspondingly connecting the virtual Bluetooth audio transmission model protocol channels with multiple external Bluetooth speakers;
Transmitting parsed audio information to the multiple sound channels in the audio manager; and
Playing the audio information in the multiple sound channels through the multiple external Bluetooth speakers.

Figure 5:
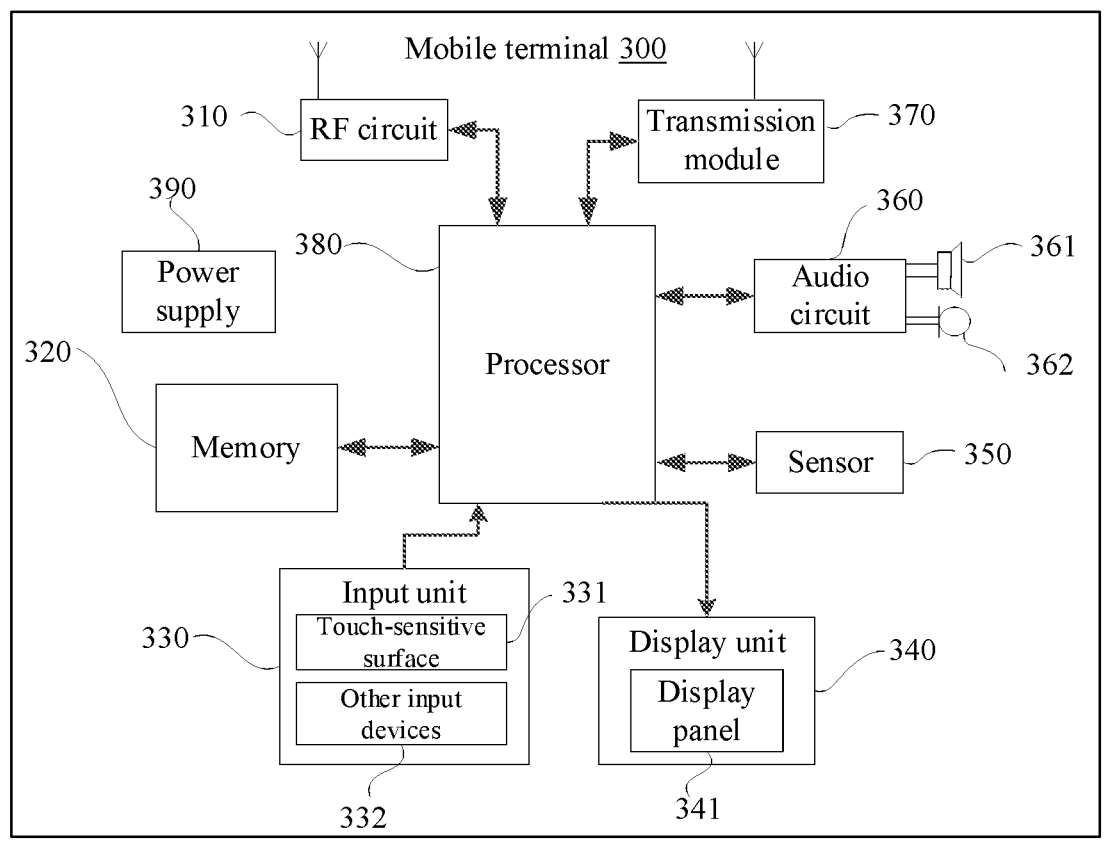
FIG. 5 is a schematic structural diagram of another mobile terminal provided by an embodiment of the present application.

FIG. 5 shows a specific structural block diagram of a mobile terminal provided by an embodiment of the present application. The mobile terminal can be used to implement the Bluetooth speaker control method provided in the above embodiments. The mobile terminal 300 can be a smart phone or a tablet computer. In addition, the mobile terminal may further include the following components, the RF circuit 310 is used to receive and send electromagnetic waves, realize mutual conversion between electromagnetic waves and electrical signals, and communicate with communication networks or other devices. The RF circuit 310 may include various existing circuit elements for performing these functions, such as antennas, radio frequency transceivers, digital signal processors, encryption/decryption chips, Subscriber Identity Module (SIM) cards, memory, and the like. The RF module 310 can communicate with various networks, such as the Internet, an enterprise intranet, or a wireless network, or communicate with other devices via the wireless network. The wireless network may be a cellular phone network, a wireless local-area network (WLAN), or a metropolitan area network (MAN). The wireless network can adopt various communication standards, protocols, and technology, including but being not limited to Global System for Mobile Communication (GSM), Enhanced Data GSM Environment (EDGE), wideband code division multiple access (W-CDMA), Code division access (CDMA), time division multiple access (TDMA), Bluetooth, Wireless Fidelity (Wi-Fi) (such as Institute of Electrical and Electronics Engineers (IEEE) 802.11a, IEEE 802.11b, IEEE 802.11g and/or IEEE 802.11n), a Voice over Internet Protocol (VoIP), Worldwide Interoperability for Microwave Access (Wi-Max), other protocols used for email, instant message, and short message, or other suitable communication protocols, and even including future protocols.

The memory 320 can be used to store software programs and modules, such as program instructions/modules corresponding to the control method of the Bluetooth speaker in the above-mentioned embodiments. The processor 380 executes various functional applications and data processing by running the software programs and modules stored in the memory 320, that is, realizes the function of the control method of the Bluetooth speaker. The memory 320 may include high-speed random access memory, and may also include non-volatile memory, such as one or more magnetic storage devices, flash memory, or other non-volatile solid-state memory. In some instances, the memory 320 may further include a memory that is remotely located relative to the processor 380, and these remote memories may be connected to the mobile terminal 300 through a network. Examples of the aforementioned networks include, but are not limited to, the Internet, intranets, local area networks, mobile communication networks, and combinations thereof.

The input unit 330 may be configured to receive information, such as numbers or characters, and create input of signals from keyboards, touch screens, mice, joysticks, optical or track balls, which may be related to user configuration and function control. Specifically, the input unit 330 may include a touch-sensitive surface 331 and other input devices 332. The touch-sensitive surface 331, also called a touch screen or a touch pad, may collect touch operations by a user on or close to it (e.g., touch operations on the touch-sensitive surface 331 or close to the touch-sensitive surface 331 by the user using a finger, a stylus, and/or any other appropriate object or attachment) and drive corresponding connecting devices according to preset programs. The touch-sensitive surface 331 may include two portions, a touch detection device and a touch controller. The touch detection device may be configured to detect the touch location by the user and detect the signal brought by the touch operation, and then transmit the signal to the touch controller. The touch controller may be configured to receive the touch information from the touch detection device, convert the touch information into touch point coordinates information of the place wherein the touch screen may be contacted, and then send the touch point coordinates information to the processor 380. The touch controller may also receive commands sent by the processor 380 for execution. Moreover, the touch-sensitive surface 331 may be realized by adopting multiple types of touch-sensitive surfaces, such as resistive, capacitive, infrared, and/or surface acoustic sound wave surfaces. Besides the touch-sensitive surface 331, the input unit 330 may further include other input devices 332, such as the input devices 332 may also include, but not limited to, one or multiple types of physical keyboards, functional keys (for example, volume control buttons and switch buttons), trackballs, mice, and/or joysticks.

The display unit 340 may be configured to display information input by the user, provided to the user, and various graphical user interfaces on the terminal 300. These graphical user interfaces may be composed of graphics, texts, icons, videos, and/or combinations thereof. The display unit 340 may include a display panel 341. The display panel 341 may be in a form of an LCD (Liquid Crystal Display), an OLED (Organic Light-Emitting Diode), or any other form available at the time of the present disclosure or one of ordinary skill in the art would have perceived at the time of the present disclosure. Furthermore, the touch-sensitive surface 331 may cover the display panel 341. After the touch-sensitive surface 331 detects touch operations on it or nearby, it may transmit signals of the touch operations to the processor 380 to determine the type of the touch event. Afterwards, according to the type of the touch event, the processor 380 may provide corresponding visual output on the display panel 341. In FIG. 4, the touch-sensitive surface 331 and the display panel 341 realize the input and output functions as two independent components. Alternatively, the touch-sensitive surface 331 and the display panel 341 may be integrated to realize the input and output functions.

The terminal 300 may further include at least one type of sensor 350, for example, an optical sensor, a motion sensor, and other sensors. An optical sensor may include an environmental optical sensor and a proximity sensor, wherein the environmental optical sensor may adjust the brightness of the display panel 341 according to the brightness of the environment, and the proximity sensor may turn off the display panel 341 and/or back light when the terminal 300 may be moved close an ear of the user. As a type of motion sensor, a gravity acceleration sensor may detect the magnitude of acceleration in various directions (normally three axes) and may detect the magnitude of gravity and direction when it may be stationary. The gravity acceleration sensor may be used in applications of recognizing the attitude of the terminal 300 (e.g., switching screen orientation, related games, and magnetometer calibration) and functions related to vibration recognition (e.g., pedometers and tapping); the terminal 300 may also be configured with a gyroscope, barometer, hygrometer, thermometer, infrared sensor, and other sensors.

An audio circuit 360, a speaker 361, and a microphone 362 may provide audio interfaces between the user and the terminal 300. The audio circuit 360 may transmit the electric signals, which may be converted from the received audio data, to the speaker 361, and the speaker 361 may convert them into the output of sound signals; on the other hand, the microphone 362 may convert the collected sound signals into electric signals, which may be converted into audio data after they may be received by the audio circuit 360; after the audio data may be output to the processor 380 for processing, it may be transmitted via the RF circuit 310 to, for example, another terminal; or the audio data may be output to the memory unit 320 for further processing. The audio circuit 360 may further include an earplug jack to provide communication between earplugs and the terminal 300.

Via the transmission module 370 (such as Wi-Fi module), the terminal 300 may help users receive and send emails, browse web pages, and visit streaming media. It may provide the user with wireless broadband Internet access. Although FIG. 5 shows the transmission module 370, it can be understood that it is not an essential component of the mobile terminal 300 and can be completely omitted as required without changing the essence of the invention.

The processor 380 may be the control center of the terminal 300. The processor 380 may connect to various parts of the entire terminal 300 utilizing various interfaces and circuits. The processor 380 may conduct overall monitoring of the terminal 300 by running or executing the software programs and/or modules stored in the memory unit 320, calling the data stored in the memory unit 320, and executing various functions and processing data of the terminal 300. The processor 380 may include one or multiple processing core(s). The processor 380 may integrate an application processor and a modem processor, wherein the application processor may process the operating system, user interface, and application programs, and the modem processor may process wireless communication.

The terminal 300 may further include a power supply 390 (for example a battery), which supplies power to various components. The power supply may be logically connected to the processor 380 via a power management system so that charging, discharging, power consumption management, and other functions may be realized via the power management system. The power supply 390 may further include one or more than one DC or AC power supply, a recharging system, a power failure detection circuit, a power converter or inverter, a power status indicator, and other random components.

Although not shown, the terminal 300 may also include a camera, Bluetooth module, etc. Also, the display unit of the terminal may be a touch screen display, and the terminal may further include at least one non-transitory processor-readable memory, and one or more programs (i.e., sets of instructions), wherein the one or more programs may be stored in the memory, and may be configured to be executed by one or more processors to perform instructions:

Acquiring an audio information;
Parsing the audio information;
Constructing multiple sound channels through an audio manager in a system framework of the mobile terminal;
Constructing multiple virtual Bluetooth audio transmission model protocol channels through a Bluetooth protocol stack of the mobile terminal;
Correspondingly connecting the virtual Bluetooth audio transmission model protocol channels with multiple external Bluetooth speakers;
Transmitting parsed audio information to the multiple sound channels in the audio manager; and
Playing the audio information in the multiple sound channels through the multiple external Bluetooth speakers.

During the specific implementation, the foregoing modules may be implemented as a separate entity, or may be implemented in any combination, and may be implemented as the same or a plurality of entities. The specific implementation of the foregoing modules refers to the foregoing method embodiments, and details are not described herein again.

It will be understood by those of ordinary skill in the art that all or part of the operations of the various methods in the above embodiments may be completed by instructions or completed by controlling related hardware through instructions, which may be stored in a computer-readable storage medium and loaded and executed by the processor. To this end, the embodiment of the present invention provides a storage medium in which multiple instructions are stored, which can be loaded by a processor to perform the operations in any of the game picture display methods provided by the embodiment of the present invention.

The storage medium may include a Read Only Memory (ROM), a RAM, a magnetic disk or an optical disk, and the like.

Due to the instructions stored in the storage medium, the steps in any Bluetooth speaker control method provided in the embodiments of the present application can be executed. Therefore, the beneficial effects that can be achieved by any Bluetooth speaker control method provided by the embodiments of the present application can be achieved. For details, refer to the previous embodiments, and details will not be repeated here.

In the foregoing embodiments, the descriptions of each embodiment have their own emphases, and for parts not described in detail in a certain embodiment, reference may be made to relevant descriptions of other embodiments.

In the above, although the present disclosure has been disclosed in the above preferred embodiments, the above preferred embodiments are not intended to limit the present disclosure, and those of ordinary skill in the art can make various changes and modifications without departing from the spirit and scope of the present disclosure. Therefore, the scope of protection of the present disclosure is subject to the scope defined by the claims.

What is claimed is:

1. A Bluetooth speaker control method, applicable to a mobile terminal, wherein the Bluetooth speaker control method comprises following steps:
    acquiring an audio information;
    parsing the audio information;
    constructing multiple sound channels through an audio manager in a system framework of the mobile terminal;
    constructing multiple virtual Bluetooth audio transmission model protocol channels through a Bluetooth protocol stack of the mobile terminal;
    correspondingly connecting the virtual Bluetooth audio transmission model protocol channels with multiple external Bluetooth speakers;
    transmitting parsed audio information to the multiple sound channels in the audio manager;
    playing the audio information in the multiple sound channels through the multiple external Bluetooth speakers;
    directly measuring and adjusting a delay time on the mobile terminal by virtually creating a corresponding number of A2DP protocol channels through the Bluetooth protocol stack to connect with the multiple external Bluetooth speakers; and
    conducting audio playback tests for the multiple external Bluetooth speakers individually, and using a microphone of the mobile terminal to capture sound and obtain a corresponding delay time for the multiple external Bluetooth speakers.

2. The Bluetooth speaker control according to claim 1, wherein the method further comprises the following step:
    performing synchronous detection on the multiple external Bluetooth speakers.

3. The Bluetooth speaker control according to claim 2, wherein in the step of performing synchronous detection on the multiple external Bluetooth speakers, the method further comprises the following step:
    acquiring delay times of the multiple external Bluetooth speakers.

4. The Bluetooth speaker control according to claim 3, wherein in the step of performing synchronous detection on the multiple external Bluetooth speakers, the method further comprises following steps:
    determining a longest delay time according to obtained delay times of the multiple external Bluetooth speakers; and
    configuring the longest delay time as a delay time of an audio playback.

5. A storage medium, wherein multiple instructions are stored in the storage medium, and the instructions are configured to be loaded by a processor to execute the Bluetooth speaker control method according to claim 1.

6. A mobile terminal, comprising a processor and a memory, wherein the processor is electrically connected to the memory, the memory is configured to store instructions and data, and the processor is configured to execute steps of the Bluetooth speaker control method according to claim 1.

7. A Bluetooth speaker control system, applicable to a mobile terminal, wherein the Bluetooth speaker control system comprises:
    an audio acquirer configured to acquire an audio information;
    an audio parser configured to parse the audio information;
    a sound channel constructer configured to construct multiple sound channels through an audio manager in a system framework of the mobile terminal;
    a Bluetooth protocol constructer configured to construct multiple virtual Bluetooth audio transmission model protocol channels through a Bluetooth protocol stack of the mobile terminal;
    a connector configured to correspondingly connect the virtual Bluetooth audio transmission model protocol channels with multiple external Bluetooth speakers;
    an audio information transmitter configured to transmit parsed audio information to the multiple sound channels in the audio manager; and
    an audio information player configured to play the audio information in the multiple sound channels through the multiple external Bluetooth speakers;
    wherein the Bluetooth speaker control system is configured to directly measure and adjust a delay time on the mobile terminal by virtually creating a corresponding number of A2DP protocol channels through the Bluetooth protocol stack to connect with the multiple external Bluetooth speakers; and the Bluetooth speaker control system is configured to conduct audio playback tests for the multiple external Bluetooth speakers individually, and use a microphone of the mobile terminal to capture sound and obtain a corresponding delay time for the multiple external Bluetooth speakers.

8. The Bluetooth speaker control system according to claim 7, further comprises:
    a synchronization detector configured to perform synchronous detection on the multiple external Bluetooth speakers.

9. The Bluetooth speaker control system according to claim 8, wherein the synchronization detector comprises:
    a delay acquirer configured to acquire delay times of the multiple external Bluetooth speakers.

10. The Bluetooth speaker control system according to claim 8, wherein the synchronization detector further comprises:
  a delay time determiner configured to determine a longest delay time according to obtained delay times of the multiple external Bluetooth speakers; and
  a delay time configurer configure to configure the longest delay time as a delay time of an audio playback.

* * * * *